United States Patent [19]

Grootscholten et al.

[11] Patent Number: 4,985,272
[45] Date of Patent: Jan. 15, 1991

[54] FAT-CONTAINING COMPOSITIONS HAVING A LOW PHOSPHATIDE CONTENT

[76] Inventors: Paulus A. M. Grootscholten, Anjer 47, 2678 PC De Lier; Gerrit L. Van Der Schee, Siriusstraat 11, 3235 PL Rockanje, both of Netherlands

[21] Appl. No.: 308,213

[22] Filed: Feb. 9, 1989

[30] Foreign Application Priority Data

Feb. 9, 1988 [NL] Netherlands ............... 8800299

[51] Int. Cl.$^5$ ............................................. A23D 9/00
[52] U.S. Cl. ................................. 426/609; 426/601; 426/604; 426/417; 426/811
[58] Field of Search ............... 426/601, 417, 609, 811, 426/604

[56] References Cited

U.S. PATENT DOCUMENTS 4,849,019  7/1989  Yasukawa et al. ............... 106/244

FOREIGN PATENT DOCUMENTS 1113241  5/1968  United Kingdom ............... 426/603

Primary Examiner—Donald E. Czaja
Assistant Examiner—Evan Federman
Attorney, Agent, or Firm—Cushman, Darby & Cushman

[57] ABSTRACT

A frying fat having improved anti-spattering behavior due to the presence of a specific phosphatide composition, which phosphatide composition, however, induces only very limited browning on frying. The phosphatide composition is added at a very low concentration level of about 0.01 wt. %. The phosphatide composition used is enriched in PC and PI, at the cost of PE and sugars.

11 Claims, No Drawings

FAT-CONTAINING COMPOSITIONS HAVING A LOW PHOSPHATIDE CONTENT

FIELD OF THE INVENTION

The present invention relates to fat-containing compositions having a low phosphatide content. Examples of phosphatides are: phosphatidyl choline, phosphatidyl ethanolamine, phosphatidyl inositol, phosphatide acid, phosphatidyl serine, acetyl phosphatidyl ethanolamine, phosphatidyl glycerol, as well as the monoacyl variants of these compounds obtainable by hydrolysis.

DESCRIPTION OF THE PRIOR ART

The use of phosphatides in fat-containing compositions is known from the state of the art. For phosphatides are used in fat-containing compositions such as, for example, margarines, as emulsifier and also as anti-spattering agent.

In the fat-containing products as described in the prior art, phosphatides are mostly used at a concentration level of more than 0.1 wt. %, calculated on the fat present in the product. If such products are heated to temperatures lying well above 100° C., it appears that these phosphatides have a favourable influence on the spattering behaviour of such products. That is to say that if these fat products are brought into contact with water at such high temperatures, it appears that the evaporation of the water is accompanied by less occurrence of spattering than is observed with identical products containing no phosphatides.

Fat products as described in the prior art, which contain considerable amounts of phosphatides, have the drawback that, after having been heated to well above 100° for some time, they develop a dark, unattractive colour varying from dark brown to black. Even if low concentrations of phosphatides are present, it appears that in the conventional fat products a browning effect occurs uupon heating. Although such a browning effect, when frying with fat products, is appreciated in a number of countries, there are also numerous countries where such browning is regarded as undesirable. In fat products, such as deep-frying oils, such a browning effect is generally undesired.

SUMMARY OF THE INVENTION

It has now been found that, in the fat-containing compositions according to the present invention, no or barely any browning occurs during prolonged heating to temperatures well above 100° C., while, moreover, these compositions still display a spattering behaviour that is in every way acceptable.

The fat-containing compositions according to the present invention are characterized by the fact that they contain a total of less than 0.1 wt. % of phosphatides and the contents of sugars and different phosphatides meet the following criteria:

$$[PC]+[LPE]+[PI]>0.003 \text{ wt. \%,}$$

$$[PE]+[LPE]<0.003 \text{ wt. \%, and}$$

$$[\text{sugars}]<[PC],$$

where:
PC stands for phosphatidyl choline, LPE for lysophosphatidyl ethanolamine, PI for phosphatidyl inositol and PE for phosphatidyl ethanolamine, and the weight percentages are calculated on the amount of fat present in the composition. With the square brackets it is further indicated that what is involved here is the weight concentration expressed in percentages, calculated on the amount of fat present, of the phosphatide indicated within the brackets or the sugars indicated within the brackets.

Although it may be expected that, through the reduction of the phosphatide content in the compositions according to the invention, the degree of browning during the heating will decrease somewhat, it is unexpected that fat compositions meeting the above-mentioned criteria display barely any or no browning during prolonged heating to temperatures well above 100° C. Even if such products are heated for a long time to temperatures around 180° C., it appears that barely any or no browning occurs.

In spite of the fact that the compositions according to the present invention only contain small amounts of phosphatides, such compositions still appear to display an unexpectedly good spattering behaviour. Accordingly, the compositions according to the invention combine a completely acceptable spattering behaviour with the characteristic that they exhibit barely any or no browning during heating. In order to obtain the above-mentioned combination of positive properties, it is necessary, however, that the above-mentioned criteria with respect to the contents of different phosphatides be met.

The phosphatide mixtures mostly used in fat compositions are obtained as by-product of the refining of triglyceride oils. Such phosphatide mixtures usually consist for 50-65 wt. % of phosphatides, 30-40 wt. % of neutral glycerides, free fatty acids, sterols, tocopherols etc., and for 5-10 wt. % of sugars. The phosphatide fraction in such mixtures mostly consists mainly of PC, PE, PI and phosphatide acid, with especially the first two compounds mentioned being present in relatively high concentrations.

Although the above-mentioned phosphatide mixtures, such as obtained in the refining of triglyceride oils like soya oil, rapeseed oil and groundnut oil, consist mainly of diacylphosphatides, small amounts of monoacylphosphatides can also be present therein.

Moreover, it is not unusual to hydrolyse such phosphatide mixtures completely or partly, as a result of which diacylphosphatides are converted into the corresponding monoacylphosphatides.

DESCRIPTION OF PREFERRED EMBODIMENTS

In the preparation of the compositions according to the invention, preferably phosphatide mixtures are used that have been upgraded further, in the sense that they have a reduced sugar content and/or have been enriched in PC and/or PI at the expense of PE. Such compositions, particularly suitable for use in the present fat compositions, can be obtained by treating phosphatide mixtures obtained for example in the refining of soya oil, rapeseed oil and groundnut oil, with a suitable extracting agent such as, for example, ethyl alcohol, or by subjecting such compositions to techniques such as ultrafiltration.

Although the fat-containing compositions according to the invention, as described above, have very acceptable properties, compositions are preferred in which the phosphatide contents meet the following criteria:

$$[PC]+[LPE]+[PI]>0.004 \text{ wt. \%,}$$

[PE]+[LPE]<0.002 wt. %, the weight percentages being calculated on the amount of fat present in the composition.

The above-mentioned criteria are based on the observation that, of the various phosphatide compounds, particularly PC, LPE and PI have a positive influence on the spattering behaviour. Moreover, it has appeared that PE and LPE provide a substantial contribution to the browning effect as it occurs during the heating of fat compositions containing these phosphatides in considerable amounts.

Besides PE and LPE, also the presence of sugars appears to contribute considerably to the browning effect. Since therefore the browning effect can be attributed mainly to the presence of PE, LPE and sugars, in the present compositions the sum of the contents of sugars, phosphatidyl ethanolamine and lysophosphatidyl ethanolamine, calculated on amount of fat present in the composition, is preferably less than 0.004 wt. %. Further, the content of sugars is preferably smaller than the content of phosphatidyl choline divided by 5.

In view of the strong contribution of sugars to the browning effect, the compositions according to the invention preferably contain, calculated on the amount of fat present, not more than 0.003 wt. %, more particularly not more than 0.001 wt. % of sugars.

Since even amounts of 0.001 wt. % can give rise to a minimal browning effect, particularly preferred are compositions according to the present invention that contain less than 0.0005 wt. % of sugars, calculated on the fat present. In this application, by sugars are understood mono- as well as di- and oligosaccharides. Since, however, particularly mono- and disaccharides appear to have a negative influence, the above-mentioned limits apply mainly with respect to these sugars.

Although phosphatides and sugars can be incorporated in the compositions according to the invention via the addition of phosphatide mixtures, it is also possible that these components are already present in the fat fractions incorporated in the compositions. In spite of the fact that, generally speaking, during the refining of oils the greater part of the sugars and phosphatides are removed from the oils, an amount of phosphatides and sugars, depending on the quality of the refining, still remains in the oils.

As the compositions according to the invention preferably contain as few sugars as possible, preferably a high quality, i.e. well refined, fat is used. This fat preferably contains less than 0.001 wt. %, more particularly even less than 0.0005 wt. % of sugars.

The terms oil and fat are considered synonymous in this application and are consequently used interchangeably. Further, under fats, and therefore also oils, triglyceride mixtures are understood, as well as non-toxic compositions having properties comparable with those of triglyceride mixtures. Examples of such compositions are compositions consisting completely or partly of indigestible fatty acid esters of sugars, such as for example sucrose octa-esters of fatty acids, as well as other more or less indigestible fat-like compositions such as jojoba oil and waxes. Mixtures of triglycerides with the last-mentioned materials can also be used in the fat compositions according to the present invention. Preferably, as present in the compositions according to the invention, the fat consists of triglycerides.

Although the positive properties of the compositions according to the invention are also found in compositions containing considerable amounts of water, the fat compositions according to the invention preferably contain a limited amount of water. Preferably, the compositions contain at least 75 wt. % of fat. Since the occurrence of browning is especially undesirable for compositions, such as deep-frying fats, liquid oils and shortenings, which consist virtually completely of fat, the compositions according to the invention preferably contain at least 95 wt. % of fat.

Seeing that, of the different phosphatides as present in the compositions according to the invention, especially PC and PI provide a positive contribution, whereas mainly PE provides a clearly negative contribution, these phosphatides are preferably present in concentrations such that: ([PC]+[PI])/[PE]>3. Particularly preferred are compositions in which the above-mentioned phosphatides are present in concentrations such that: ([PC]+[PI])/[PE]>10.

The degree of browning such as occurs during the heating of fat compositions can be measured with the aid of the so-called Lovibond method. It has been found that both the Lovibond yellow value and the Lovibond red value increase with increasing browning. After having been heated for at least 2 hours to a temperature of at least 180° C., the compositions according to the invention preferably have a Lovibond yellow value of less than 60 and/or a Lovibond red value of less than 15. If the fat-containing compositions according to the invention contain more that 95 wt. % of fat, these compositions preferably contain a Lovibond yellow value of less than 25 and a Lovibond red value of less than 5 after the above-mentioned treatment.

Since phosphatide compositions consisting entirely of PC and/or PI are rather expensive, in the compositions according to the invention preferably mixtures which also contain PE and/or LPE are used. Since such compositions at higher concentration levels give rise to browning, the compositions according to the invention contain a total of preferably less than 0.01 wt. %, more particularly less than 0.008 wt. % of phosphatides.

In another embodiment, the present invention relates to a process for heating foodstuffs by bringing these foodstuffs into contact with a fat-containing composition according to the present invention, which composition has been heated to a temperature of more than 120° C., preferably to a temperature of 150°-200° C. Examples of such processes are deep-frying, preparing fondue and frying.

EXAMPLES

The invention is further illustrated by the following examples:

EXAMPLE 1

Six compositions were compared, consisting of sunflower oil (brand "Impériale", ex N.V. Union S.A., Belgium, which contain 0.005 to 0.4 wt. % of a phosphatide composition (A), which composition (A) consists virtually completely of phosphatidyl choline (97.5 wt. %) and lysophosphatidyl choline (2.5 wt. %).

The spattering behaviour of the above-mentioned oils was determined with the aid of the following test: 25 g oil was put in a glass dish (bottom part Petri dish having a diameter of 140 mm and a height of 30 mm, made of Duran 50 ex Schott-Mainz) and heated to 180° C. Hereafter the frying behaviour of the oil was studied by frying a silver of cod fillet (brand "Vis banket", ex Iglo, The Netherlands) having the dimensions 3.5×8.5×1 cm and having a weight of approximately 15 g, for 4 minutes on both sides in the hot oil.

During the frying a sheet of paper measuring 40×40 cm (Bankpost 80 g/m², ex Rijnbank) was horizontally attached to a frame in a manner such that the centre of this sheet was situated at a distance of 25 cm above the centre of the glass dish.

After the frying test, the appearance of the sheet of paper was compared with a standard set consisting of 10 photos of paper sheets, numbered 0 to 9, which photos, beginning with N° 0, display a decreasing number of fat spots. Photo N° 9 pertains to a product that displayed an ideal spattering behaviour, i.e. this photo shows barely any or no spots on the sheet of paper. The sheet of paper illustrated on photo N° 0 pertains to a refined sunflower oil to which, after refining, no additional ingredients have been added. On comparing the paper sheets as used in the frying tests with the compositions described here with the set of photos, a spattering score was given identical with the number of the photo showing a sheet of paper that best corresponded with the sheet used. If there was no clear preference for one particular photo, a spattering score was given equal to the average of the numbers of the two most similar photos.

Besides the frying test described above, the abovementioned compositions were subjected to an experiment in which one coated cod fillet of the same origin and dimensions as already described above, was deep-fried for 4 minutes in 1 liter of such a composition. The compositions were heated for this purpose to a temperature of 185° C. The coating material with which the cod was covered, was prepared by mixing 1 egg, at a temperature of 0° C., with 200 ml water of 0° C., and adding 185 ml flour of 0° C.

The frying test described above was repeated several times for each composition. Before the first frying test and thereafter after each even number of frying tests, the Lovibond yellow and red values of the oil composition were measured with the aid of a Lovibond Tintometer Model E (ex The Tintometer Ltd, Salisbury, England) with a 2 inch cell present therein.

In this manner the results were obtained as shown in the following table:

| Amount (A) added | Spattering figure | Frying time in hours | Lovibond Red | Lovibond Yellow |
| --- | --- | --- | --- | --- |
| 0.000 wt. % | 1.0 | 0 | 0.2 | 2.2 |
| | | 0.5 | 0.3 | 3.2 |
| | | 1.0 | 0.3 | 3.6 |
| | | 1.5 | 0.3 | 4.0 |
| | | 2.0 | 1.0 | 4.8 |
| 0.005 wt. % | 5.0 | 0 | 0.1 | 0.9 |
| | | 0.5 | 0.1 | 1.1 |
| | | 1.0 | 0.2 | 1.5 |
| | | 1.5 | 0.4 | 2.2 |
| | | 2.0 | 0.6 | 4.5 |
| 0.01 wt. % | 6.5 | 0 | 0.2 | 2.1 |
| | | 0.5 | 0.3 | 2.8 |
| | | 1.0 | 0.3 | 3.5 |
| | | 1.5 | 0.4 | 4.3 |
| | | 2.0 | 1.0 | 5.1 |
| 0.02 wt. % | 7.0 | 0 | 0.2 | 2.5 |
| | | 0.5 | 0.4 | 3.4 |
| | | 1.0 | 0.5 | 4.5 |
| | | 1.5 | 0.6 | 5.2 |
| | | 2.0 | 1.0 | 5.2 |
| 0.05 wt. % | 6.5 | 0 | 0.3 | 2.2 |
| | | 0.5 | 0.6 | 4.5 |
| | | 1.0 | 1.2 | 6.0 |
| | | 1.5 | 1.5 | 10.5 |
| | | 2.0 | 2.2 | 20.8 |
| 0.1 wt. % | 8.5 | 0 | 0.2 | 1.6 |
| | | 0.5 | 0.5 | 2.8 |
| | | 1.0 | 2.2 | 7.5 |
| | | 1.5 | 3.5 | 14.2 |
| | | 2.0 | 4.5 | 18.2 |
| 0.4 wt. % | 9.0 | 0 | 0.2 | 1.5 |
| | | 0.5 | 0.6 | 4.5 |
| | | 1.0 | 1.7 | 7.5 |
| | | 1.5 | 4.1 | 15.0 |
| | | 2.0 | 5.1 | 26.2 |

EXAMPLE 2

Experiment 1 was repeated, with the proviso that, instead of phosphatide composition (A), a phosphatide composition (B) was now used containing 85 wt. % phosphatidyl choline, 8.2 wt. % lysophosphatidyl choline and about 1 wt. % of sugars.

In this manner the following results were obtained:

| Amount (A) added | Spattering figure | Frying time in hours | Lovibond Red | Lovibond Yellow |
| --- | --- | --- | --- | --- |
| 0.005 wt. % | 5.0 | 0 | 0.1 | 1.4 |
| | | 0.5 | 0.1 | 1.5 |
| | | 1.0 | 0.4 | 2.1 |
| | | 1.5 | 0.5 | 3.6 |
| | | 2.0 | 0.7 | 3.7 |
| 0.01 wt. % | 6.0 | 0 | 0.2 | 2.6 |
| | | 0.5 | 0.3 | 3.3 |
| | | 1.0 | 0.4 | 4.2 |
| | | 1.5 | 0.4 | 4.5 |
| | | 2.0 | 0.6 | 7.7 |
| 0.02 wt. % | 6.5 | 0 | 0.1 | 0.9 |
| | | 0.5 | 0.3 | 1.5 |
| | | 1.0 | 0.5 | 3.5 |
| | | 1.5 | 0.5 | 4.3 |
| | | 2.0 | 1.0 | 6.3 |
| 0.05 wt. % | 6.0 | 0 | 0.2 | 1.6 |
| | | 0.5 | 0.6 | 3.1 |
| | | 1.0 | 1.0 | 5.5 |
| | | 1.5 | 2.0 | 8.5 |
| | | 2.0 | 2.8 | 20.5 |
| 0.1 wt. % | 7.0 | 0 | 0.2 | 1.8 |
| | | 0.5 | 0.5 | 3.3 |
| | | 1.0 | 1.2 | 6.7 |
| | | 1.5 | 1.8 | 13.2 |
| | | 2.0 | 4.2 | 23.0 |
| 0.4 wt. % | 7.5 | 0 | 0.2 | 2.3 |
| | | 0.5 | 0.7 | 3.4 |
| | | 1.0 | 1.6 | 6.5 |
| | | 1.5 | 2.5 | 13.7 |
| | | 2.0 | 4.2 | 26.2 |

EXAMPLE 3

With the aid of the apparatus described above, the Lovibond yellow and red values of a number of sunflower oils (brand "Impériale", ex N.V. Union S.A., Belgium) were measured after these had been heated for 20 minutes to 180° C. To these oils were added different amounts of the phosphatide composition (A), as described in Example 1, and sugars. In the following table the Lovibond yellow and red values found for different combinations of sugar and phosphatide are given:

| Content sugars | 0.001 wt. % | 0.003 wt. % | 0.006 wt. % | 0.010 wt. % |
| --- | --- | --- | --- | --- |
| Content of (A) | | | | |

-continued

| Content sugars | | 0.001 wt. % | 0.003 wt. % | 0.006 wt. % | 0.010 wt. % |
|---|---|---|---|---|---|
| 0.01 wt. % | R* = | 0.2 | 0.2 | 0.3 | 1.0 |
|  | Y+ = | 2.0 | 2.2 | 3.0 | 4.5 |
| 0.05 wt. % | R = | 0.5 | 0.5 | 0.5 | 2.8 |
|  | Y = | 2.8 | 3.4 | 3.5 | 11.5 |
| 0.10 wt. % | R = | 0.6 | 1.0 | 1.3 | 2.8 |
|  | Y = | 3.5 | 4.3 | 7.3 | 13.7 |
| 0.40 wt. % | R = | 1.3 | 1.6 | 3.0 | 4.6 |
|  | Y = | 7.4 | 7.3 | 25.0 | 44.1 |

*R here stands for the Lovibond red value
+Y here stands for the Lovibond yellow value

EXAMPLE 4

In the same manner as described in Example 1, the spattering figures and Lovibond yellow and red values were determined in duplicate for two sunflower compositions (brand "Impériale", ex N.V. Union S.A., Belgium).

Composition I contained 0.01 wt. % of phosphatide composition (B) described above. Composition II contained 0.01 wt. % of a phosphatide composition (C) composed as follows: phosphatidyl choline (12.9 wt. %), phosphatidyl ethanolamine (11.7 wt. %), phosphatidyl inositol (10.0 wt. %), phosphatide acid (14.3 wt. %), acetylphosphatidyl ethanolamine (1.2 wt. %), sugars (about 5 wt. %) and glycerides.

With the duplicate determination of the spattering figure for composition I, the spattering FIGS. 5 and 6 were found. For composition II the FIGS. 1 and 2 were found.

The results of the Lovibond measurements are given in the following table:

| Frying time in hours | Composition I Lovibond | | Composition II Lovibond | |
|---|---|---|---|---|
|  | Red | Yellow | Red | Yellow |
| 0 | 0.2 | 1.3 | 0.2 | 2.0 |
|  | 0.2 | 1.2 | 0.2 | 2.1 |
| 0.5 | 0.3 | 2.1 | 0.6 | 3.6 |
| 0.5 | 0.3 | 2.6 | 0.5 | 2.6 |
| 1.0 | 0.4 | 3.4 | 0.6 | 4.2 |
|  | 0.4 | 4.0 | 0.6 | 4.3 |
| 1.5 | 0.6 | 5.0 | 0.8 | 5.2 |
|  | 0.6 | 5.5 | 0.8 | 5.6 |
| 2.0 | 1.0 | 6.0 | 1.8 | 19.0 |
|  | 1.0 | 7.0 | 1.7 | 16.0 |

We claim:

1. A frying fat composition having improved anti-spattering behavior and a reduced browning tendency on heating above 100° C., said composition consisting essentially of fat and an anti-spattering amount of an additive consisting essentially of phosphatidyl choline PC, lysophosphatidyl ethanolamine LPE, phosphatidyl inositol PI and phosphatidyl ethanolamine PE, and from no sugar up to an amount not in excess of the amount of PC present, the amount of said additive being less than 0.1 wt. %, based on the weight of fat and said additive composition being such as to meet the following criteria in weigh percentage based on the weight of fat in said composition:

PC+LPE+PI>0.003 wt. % and

PE+LPE<0.003 wt. %.

2. Composition according to claim 1 wherein the amount of sugars in the additive is less than 20% of the amount of phosphatidyl choline PC.

3. Composition according to claim 1 wherein the composition of the phosphatides is such that it meets the following criteria based on the weight of fat:

PC+LPE+PI>0.004 wt. %

PE+LPE<0.002 wt. %.

4. Composition according to claim 1 wherein $$\frac{PC + P}{PE} \text{ is } > 3.$$

5. Composition according to claim 1, wherein the sum of the weight % of sugars, phosphatidyl ethanolamine and lysophosphatidyl ethanolamine, calculated on the amount of fat present in the composition, is less than 0.004 wt. %

6. Composition according to claim 1, wherein the composition contains less than 0.001 wt. % of sugars, calculated on the fat present.

7. Composition according to claim 1, wherein the composition contains at least 75 wt. % of fat.

8. Composition according to claim 1, wherein the composition contains at least 95 wt. % of fat.

9. Composition according to claim 1, wherein the composition, after having been heated for at least 2 hours to a temperature of at least 180° C., has a Lovibond yellow value of less than 60 and/or a Lovibond red value of less than 15.

10. Composition according to claim 1, wherein the composition contains less than 0.01 wt. % of phosphatides.

11. In a process for heating a foodstuff in the presence of a frying fat composition at a temperature above 120° C., the improvement which comprises using, as the fat composition, one which consists essentially of fat and an anti-spattering amount of an additive consisting essentially of phosphatidyl choline PC, lysophosphatidyl ethanolamine LPE, phosphatidyl inositol PI and phosphatidyl ethanolamine PE and from no sugar up to an amount not in excess of the amount of PC present, the amount of said additive being less than 0.1 wt. %, based on the weight of fat and said additive composition being such as to meet the following criteria in weigh percentage based on the weight of fat in said composition:

PC+LPE+PI>0.003 wt. % and

PE+LPE<0.003 wt. % whereby spattering and browning are minimized.

* * * * *